(12) United States Patent
Endo

(10) Patent No.: US 8,077,162 B2
(45) Date of Patent: Dec. 13, 2011

(54) TOUCH PANEL AND DISPLAY DEVICE

(75) Inventor: Michiko Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 694 days.

(21) Appl. No.: 10/851,235

(22) Filed: May 24, 2004

(65) Prior Publication Data

US 2004/0239647 A1 Dec. 2, 2004

(30) Foreign Application Priority Data

May 26, 2003 (JP) .................................. 2003-148226

(51) Int. Cl.
*G06F 3/043* (2006.01)
(52) U.S. Cl. ...... 345/177; 345/173; 345/179; 178/18.01
(58) Field of Classification Search .................. 345/173, 345/179, 177; 367/907; 178/18.01–18.17
See application file for complete search history.

(56) References Cited

U.S. PATENT DOCUMENTS

| | | | |
|---|---|---|---|
| 4,725,696 A * | 2/1988 | Furukawa et al. | 345/173 |
| 5,637,839 A * | 6/1997 | Yamaguchi et al. | 178/18.04 |
| 5,812,232 A * | 9/1998 | Shiroto et al. | 349/157 |
| 6,707,450 B2 * | 3/2004 | Ahn et al. | 345/173 |
| 6,847,355 B1 * | 1/2005 | Nishikawa et al. | 345/173 |
| 6,879,319 B2 * | 4/2005 | Cok | 345/173 |
| 7,081,888 B2 * | 7/2006 | Cok et al. | 345/173 |
| 7,106,307 B2 * | 9/2006 | Cok | 345/173 |
| 7,180,505 B2 * | 2/2007 | Oh et al. | 345/173 |
| 2003/0160768 A1 * | 8/2003 | Tanabe et al. | 345/173 |
| 2003/0189554 A1 * | 10/2003 | Kawasaki et al. | 345/173 |
| 2004/0104899 A1 * | 6/2004 | Hong et al. | 345/173 |

FOREIGN PATENT DOCUMENTS

| | | |
|---|---|---|
| JP | 02-34374 | * 10/1991 |
| JP | 3-238519 | 10/1991 |
| JP | 2000-506655 | 5/2000 |
| JP | 2002-222041 | 8/2002 |
| WO | WO 98/07127 | 2/1998 |

OTHER PUBLICATIONS

Japanese Patent Office Action, mailed Jun. 17, 2008 and issued in corresponding Japanese Patent Application No. 2003-148226.

* cited by examiner

*Primary Examiner* — Kevin M Nguyen
*Assistant Examiner* — Cory Almeida
(74) *Attorney, Agent, or Firm* — Staas & Halsey LLP

(57) ABSTRACT

A touch panel includes: a transparent substrate on which surface acoustic wave is propagated; a transmission/reception unit that is formed in peripheral regions on the transparent substrate, each two of the peripheral regions facing each other, and transmit and receive the surface acoustic wave; a detecting unit that detects the location of an object touching a predetermined operation area; and a sheet member that faces the transparent substrate, with a space layer being interposed in between, and has first protrusions formed on a substrate-facing surface that faces the transparent substrate. In this touch panel, the substrate-facing surface of the sheet member is not brought into contact with the transparent substrate when an object does not touch the operation area, and the substrate-facing surface of the sheet member is brought into contact with the transparent substrate when the object touches the operation area.

20 Claims, 12 Drawing Sheets

TOUCH PANEL AND DISPLAY DEVICE

BACKGROUND OF THE INVENTION

1. Field of the Invention

The present invention relates to touch panels and display devices.

2. Description of the Related Art

Conventionally, touch panels mounted on display devices such as LCDs (Liquid Crystal Displays) have been transparent touch panels that input control signals through operations with a pen or a finger in accordance with displayed information. Among those transparent touch panels, there are SAW touch panels. In a SAW touch panel, surface acoustic wave that is propagated on a glass surface is utilized as a means of detecting touched locations.

Japanese Unexamined Patent Document 2002-222041 (hereinafter referred to as Patent Document 1) discloses the conventional SAW touch panel. The touch panel device disclosed in Patent Document 1 is formed with a glass substrate, and a touched location is detected by spotting an interrupted location of the SAW being propagated on the surface of the glass substrate. Accordingly, the most advantageous features of this touch panel device are that the light transmittance is high and that the screen of the display device is not damaged. Also, as the operation area is a solid glass surface, scratches are not easily made. Accordingly, the durability of this touch panel device is higher than that of a touch panel device of any other type.

However, as the touch panel device disclosed in Patent Document 1 is formed with only one glass plate, the shock resistance is poor. Particularly, in a case where the glass thickness is reduced to produce a thin device, the glass substrate can be easily broken even by small impact. Also, when a drop of water or oil adheres to the glass surface, the propagation of SAW is interrupted, resulting in an erroneous input.

So as to solve the above problems, a touch panel device disclosed in Japanese Patent Publication No. 3010669 (hereinafter referred to as Patent Document 2) has been developed. The touch panel device disclosed in Patent Document 2 has a transparent film placed over a glass substrate, with spacers being interposed in between. In this structure, the transparent substrate on which a surface acoustic wave is being propagated is unexposed. Thus, a scratch or a drop of water cannot adversely affect the SAW propagation characteristics.

In the touch panel device disclosed in Patent Document 2, the transparent film is placed over the glass substrate on which SAW is being propagated, with the spacers being interposed between the transparent film and the glass substrate. However, in a case where the touch panel device is employed in a compact, thin mobile device, the energy of propagated SAW is so small that a large propagation loss is caused at the spacers formed on the glass substrate. As a result, accurate location detection cannot be carried out.

SUMMARY OF THE INVENTION

It is therefore an object of the present invention to provide a touch panel and a display device in which the above disadvantages are eliminated.

A more specific object of the present invention is to provide a touch panel and a display device that can perform accurate location detecting operations.

The above objects of the present invention are achieved by a touch panel including: a transparent substrate on which surface acoustic waves are propagated; a transmission/reception unit that is formed in peripheral regions on the transparent substrate, each two of the peripheral regions facing each other, and transmit and receive the surface acoustic waves; a detecting unit that detects the location of an object touching a predetermined operation area; and a sheet member that faces the transparent substrate, with a space layer being interposed in between, and has a plurality of first protrusions formed on a substrate-facing surface of the sheet member, which surface faces the transparent substrate, the substrate-facing surface of the sheet member being not brought into contact with the transparent substrate when an object does not touch the operation area, and the substrate-facing surface of the sheet member being brought into contact with the transparent substrate when the object touches the operation area.

The above objects of the present invention are also achieved by a display device including: a liquid crystal panel; and a touch panel that is mounted on the outer surface of the liquid crystal panel, the touch panel including: a transparent substrate on which surface acoustic wave is propagated; a transmission/reception unit that is formed in peripheral regions on the transparent substrate, each two of the peripheral regions facing each other, and transmit and receive the surface acoustic wave; a detecting unit that detects the location of an object touching a predetermined operation area; and a sheet member that faces the transparent substrate, with a space layer being interposed in between, and has a plurality of first protrusions formed on a substrate-facing surface of the sheet member, which surface faces the transparent substrate, the substrate-facing surface of the sheet member being not brought into contact with the transparent substrate when an object does not touch the operation area, and the substrate-facing surface of the sheet member being brought into contact with the transparent substrate when the object touches the operation area, and the sheet member being a polarizing plate.

The above objects of the present invention are also achieved by a display device including: an organic EL display panel; and a touch panel that is mounted on the outer surface of the organic EL display panel, the touch panel including: a transparent substrate on which surface acoustic wave is propagated; a transmission/reception unit that is formed in peripheral regions on the transparent substrate, each two of the peripheral regions facing each other, and transmit and receive the surface acoustic wave; a detecting unit that detects the location of an object touching a predetermined operation area; and a sheet member that faces the transparent substrate, with a space layer being interposed in between, and has a plurality of first protrusions formed on a substrate-facing surface of the sheet member, which surfaces faces the transparent substrate, the substrate-facing surface of the sheet member being not brought into contact with the transparent substrate when an object does not touch the operation area, and the substrate-facing surface of the sheet member being brought into contact with the transparent substrate when the object touches the operation area.

BRIEF DESCRIPTION OF THE DRAWINGS

Other objects, features and advantages of the present invention will become more apparent from the following detailed description when read in conjunction with the accompanying drawings, in which.

DESCRIPTION OF THE EMBODIMENTS

First Embodiment

Figure 1:
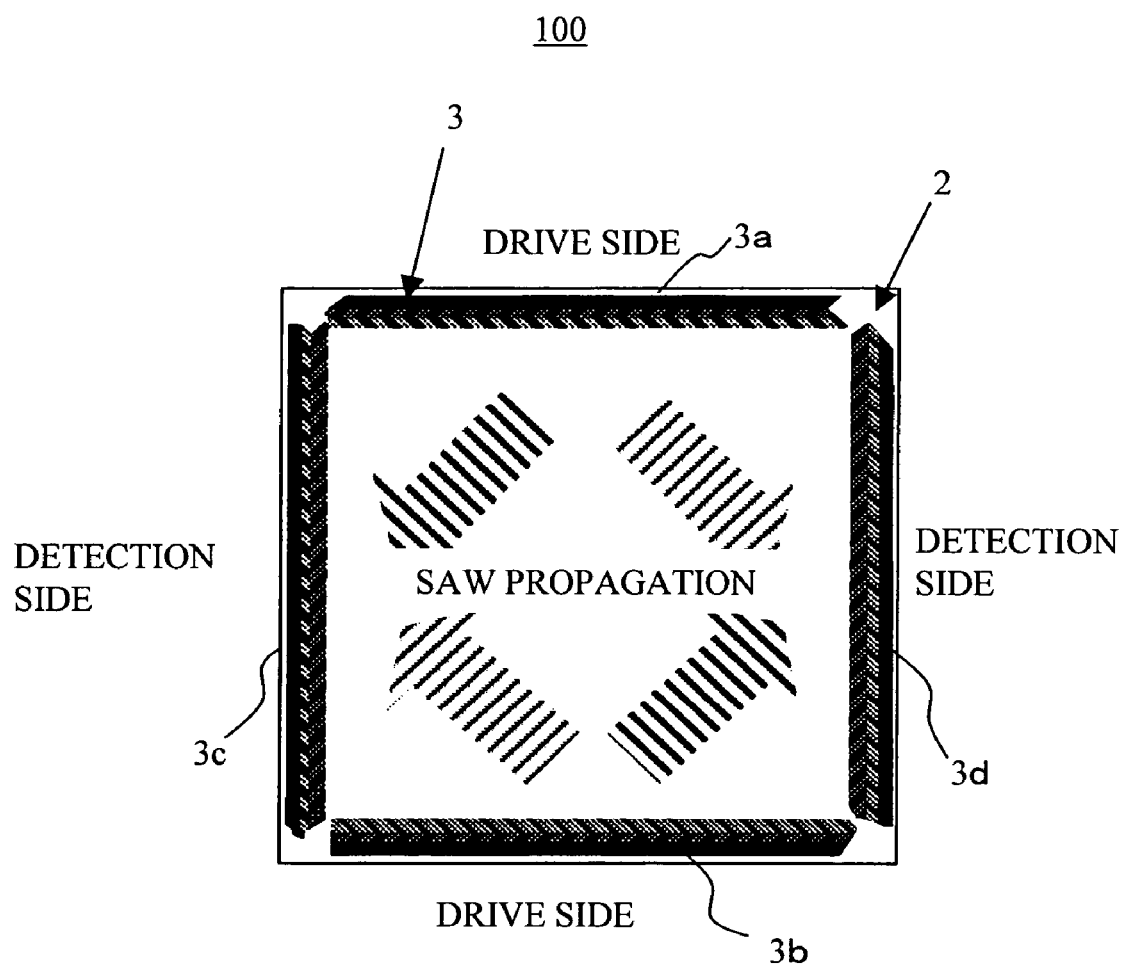
FIG. 1 illustrates a SAW touch panel in accordance with a first embodiment of the present invention.
Figure 2:
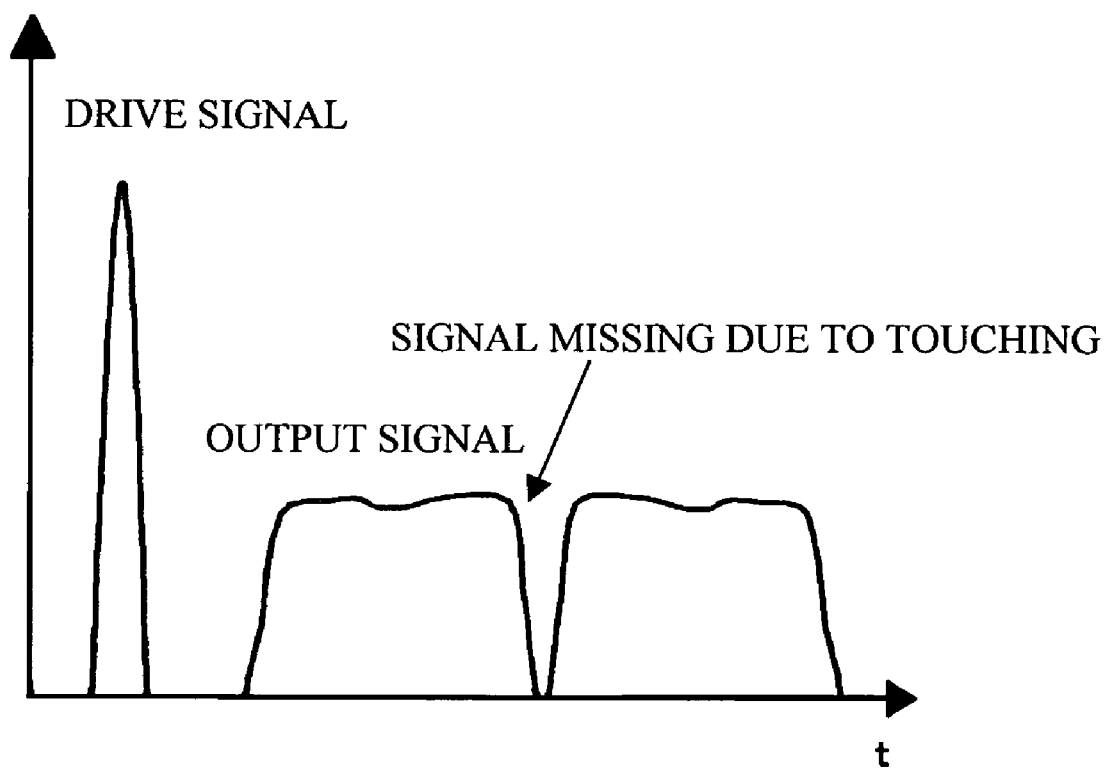
FIG. 2 shows examples of waveforms of an exciting signal and a reception signal in a location detecting operation performed by the touch panel in accordance with the first embodiment.
Figure 3:
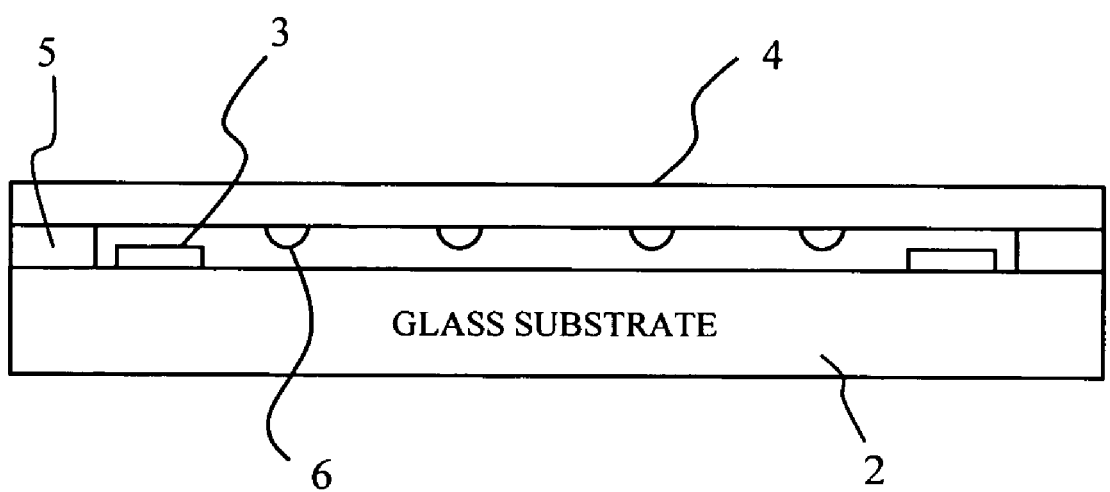
FIG. 3 is a section view of the touch panel with first protrusions in accordance with the first embodiment.

The following is a description of a first embodiment of the present invention, with reference to the accompanying drawings. FIG. 1 illustrates a SAW touch panel that is employed in the first embodiment of the present invention. FIG. 2 illustrates an example of waveforms of an exciting signal and a reception signal in a location detecting operation performed by the touch panel in accordance with the first embodiment. A transparent resin film 4 that will be described later is not shown in FIG. 1, but is shown in FIG. 3.

As shown in FIG. 1, transducers 3 that generate SAWs are formed in the peripheral regions of a glass substrate 2 of a touch panel 100. Among the four transducers 3, two transducers 3a and 3b convert electric signals into SAWs, and transmit the SAWs along the surface of the glass substrate 2. The other two transducers 3c and 3d receive the transmitted SAWs, and convert the SAWs into electric signals. If a user touches the surface of the glass substrate 2, the propagations of SAWs are interrupted on the touched spot.

The transducers 3 transmit SAWs in parallel with the diagonal lines of the touch panel 100, so that the touch panel 100 can be made compact. As shown in FIG. 2, a SAW burst wave generated from the drive end is turned into an output signal having a waveform that is elongated in the time axis direction on the reception end. If the SAW is interrupted by a touch with a finger or the like, the reception signal attenuates in the time corresponding to the interrupted spot. Accordingly, the touched location can be detected from the timing information of the attenuating portion.

The touch panel 100 of this embodiment is a small-sized type of approximately 2 to 8 inches, which are suitable for mobile devices such as PDAs (Personal Digital Assistants), portable telephones, and camcorders, and systems for automobiles such as car navigation systems. The glass substrate 2 is relatively thin, having a thickness of 0.5 to 1.5 mm.

FIG. 3 is a section view of the touch panel 100 in accordance with the first embodiment. As shown in FIG. 3, the touch panel 100 in accordance with the first embodiment includes: the glass substrate 2 on which the surface acoustic waves are propagated; the transducers 3 that are provided at the four peripheral sides of the glass substrate 2, and transmit and receive the surface acoustic waves; a detecting unit (not shown) that detects the location of an object touching a predetermined operation area, based on the surface acoustic waves received by the transducers 3; and the transparent resin film 4 that has dot spacers 6 formed on the surface facing the glass substrate 2.

When an object does not touch the operation area, the substrate-facing surface of the transparent resin film 4 is not brought into contact with the glass substrate 2. When an object touches the operation area, the substrate-facing surface of the transparent resin film 4 is brought into contact with the glass substrate 2.

In this embodiment, the glass substrate 2 represents a transparent substrate, the transducers 3 represent a transmission/reception unit, the transparent resin film 4 represents a sheet member, and the dot spacers 6 represent first protrusions.

The sheet member is not limited to the transparent resin film 4, but may be any other type of sheet. However, there should be a spacer layer 5 formed between the sheet member and the glass substrate 2, and the dot spacers 6 should be formed on the substrate-facing surface of the sheet member facing the glass substrate 2. When an object does not touch the operation area, the substrate-facing surface should not be brought into contact with the glass substrate 2. When an object touches the operation area, the substrate-facing surface should be brought into contact with the glass substrate 2. A polarizing plate 701 that is employed in a seventh embodiment of the present invention is also a sheet member of this type.

In the touch panel 100, the transparent resin film 4 bonded to the glass substrate 2 faces the SAW touch panel operation surface. The transparent resin film 4 is made of PET (polyethylene terephthalate) or PC (polycarbonate), for example. The transparent resin film 4 is bonded to the outer peripheries of the transducers 3, which are formed around the SAW touch panel operation area, with the spacer layer 5, e.q., a double-faced adhesive tape 5 of a predetermined thickness.

A large number of dot spacers 6 are formed in a matrix fashion on the substrate-facing surface of the transparent resin film 4 by a printing process. Even if the film has flexing due to a change in the environment, only the dot spacers 6 are brought into contact with the glass substrate 2. Accordingly, when touch input is not carried out, the transparent resin film 4 can be prevented from touching the surface of the glass substrate 2.

Each of the dot spacers 6 is very small, having a diameter of approximately 10 μm. Also, each of the dot spacers 6 has a hemispherical shape. Even if the dot spacers 6 touch the glass substrate 2, the contact area is so small that the SAW being propagated on the surface of the glass substrate 2 is not interrupted.

When touch input is carried out on the touch panel 100, the transparent resin film 4 is bent so greatly as to touch the SAW propagation surface of the glass substrate 2 to interrupt the SAWs. Accordingly, the touched location can be detected. The transparent resin film 4, which is the outer surface of the touch panel 100, increases the shock resistance of the touch panel 100. Even if the glass substrate 2 is broken by great impact, the transparent resin film 4 on the surface prevents fragments of glass from scattering.

In a case where the transparent resin film 4 is made of PET, and the glass substrate 2 as a SAW touch panel and the transparent resin film 4 are not subjected to surface treatment, the light transmittance is approximately 86%, which is higher than the light transmittance (80%) of a conventional touch panel with a resistive film. Also, the touch panel 100 of this embodiment does not need an ITO film that is essential for the conventional touch panel with a resistive film. Accordingly, the touch panel 100 is not colored, and the problem with the conventional resistive-film touch panel can be eliminated so that the color of the display screen is not changed.

In this embodiment, an antireflection film may be formed on either surface of each of the transparent resin film 4 and the glass substrate 2, so that the light transmittance can be increased to approximately 95%. By doing so, the shock resistance can also be increased, without reducing the brightness of the display screen. The antireflection film may be formed on only one surface of each of the transparent resin film 4 and the glass substrate 2.

So as to further increase the operability of the touch panel 100 in accordance with the first embodiment, the transparent resin film 4 is made of a material that can easily absorb SAW, such as cycloolefin, and the dot spacers 6 are made of a material that does not easily absorb SAWs, such as acryl. With this structure, input cannot easily be carried out when an object other than the film member touches the glass substrate 2. Thus, the detecting accuracy is increased.

As described above, in the touch panel 100 in accordance with the first embodiment, the transparent resin film 4 is placed over the glass substrate 2, with the predetermined space layer being interposed in between. The dot spacers 6 are formed on the substrate-facing surface of the transparent resin film 4. Accordingly, SAWs being propagated on the glass substrate 2 are not absorbed by the dot spacers 6. When the transparent resin film 4 is bent to touch the glass substrate 2 through a touch of a pen or a finger, the SAWs are absorbed. In this manner, there is only a small propagation loss of surface acoustic wave being propagated on the glass substrate 2, and accurate location detection can be performed.

Thus, a touch panel that have excellent visibility and shock resistance can be realized, without a change of color of a display screen such as a LCD.

Second Embodiment

Figure 4:
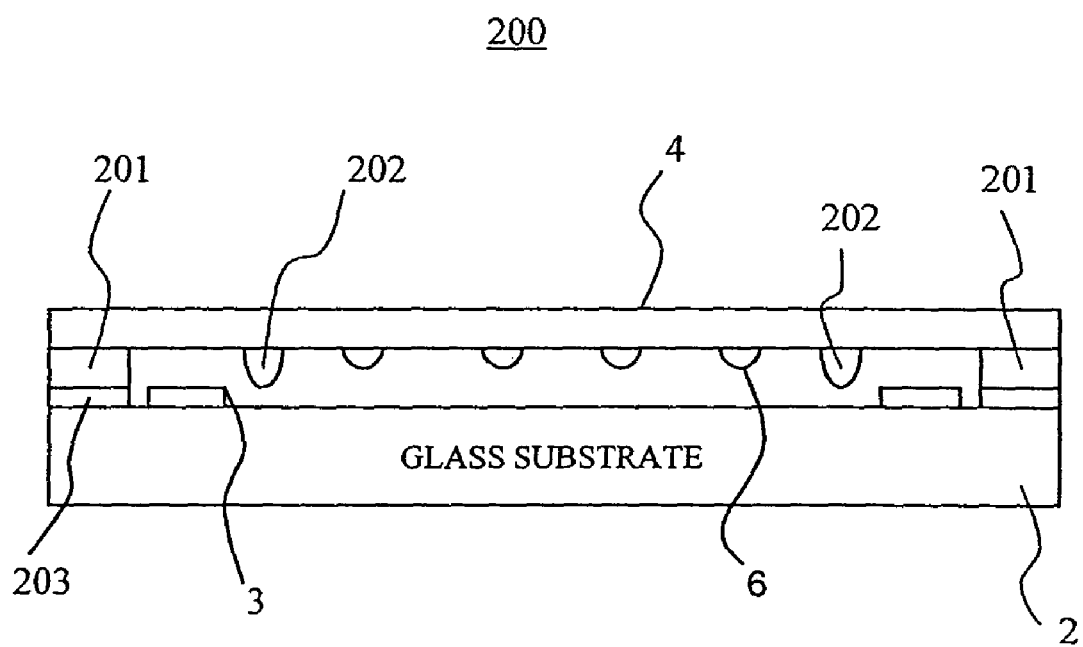
FIG. 4 is a section view of a touch panel in accordance with a second embodiment of the present invention.
Figure 5:
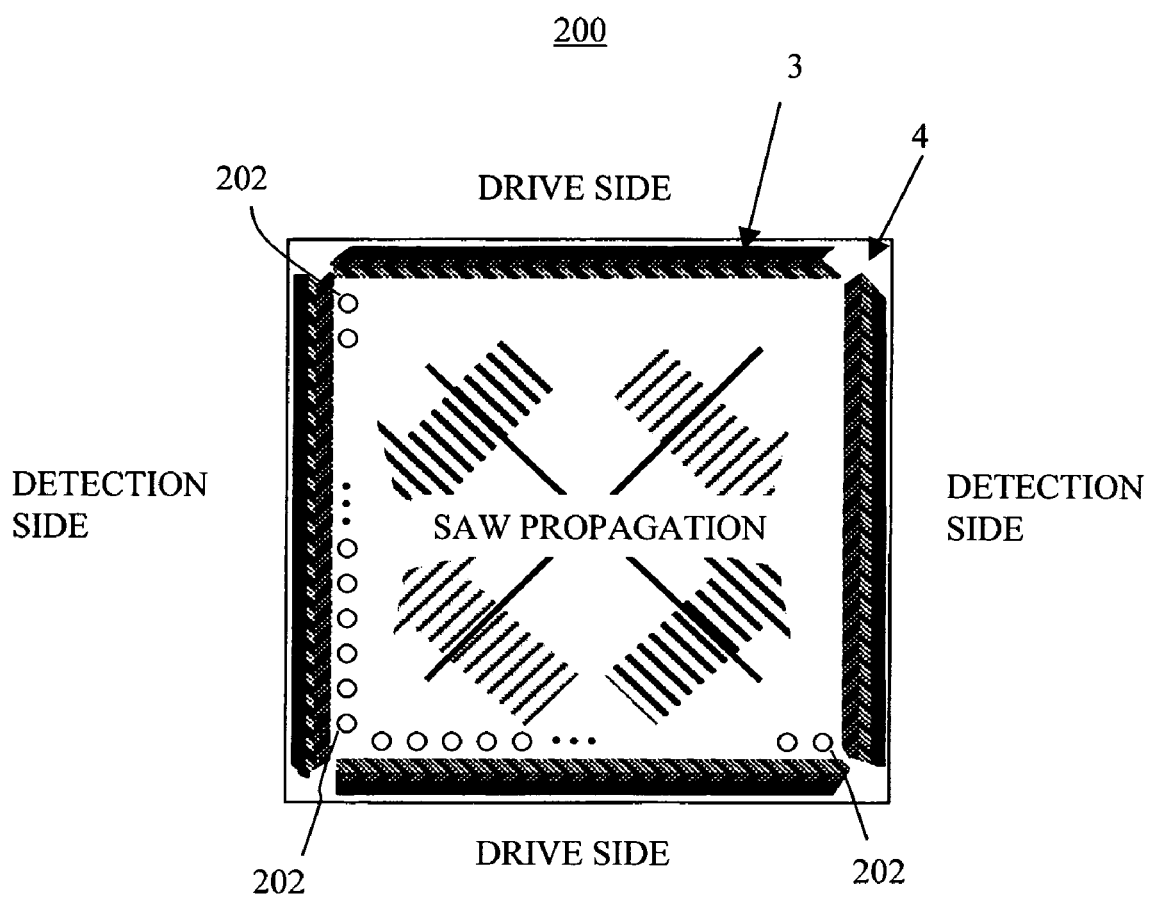
FIG. 5 is a plan view of the touch panel with second protrusions in accordance with the second embodiment.

FIG. 4 is a section view of a touch panel in accordance with a second embodiment. FIG. 5 is a plan view of the touch panel in accordance with the second embodiment that has second protrusions 202. In FIGS. 4 and 5, the same components as those of the first embodiment are denoted by the same reference numerals as the corresponding ones of the first embodiment, and explanation of them will be omitted in the following description.

In the touch panel 200 in accordance with the second embodiment, the second protrusions 202 are formed on the inner peripheral regions 204 on the substrate-facing surface of the transparent resin film 4. The inner peripheral regions 204 are not to touch the transducers 3. The second protrusions 202 are formed to extend from the inner surface film 4 so as to have respective free ends situated closer to the glass substrate 2 than the free ends of the dot spacers 6 are to the glass substrate 2. The second protrusions 202 are also dot spacers that are arranged to form dike-like mounds, as shown in FIG. 5. The second protrusions 202, as well as the dot spacers 6, may be formed through a printing process.

In the touch panel 200 in accordance with the second embodiment, dike protrusions 201 are further formed in the outer peripheral regions on the substrate-facing surface of the transparent resin film 4 of the first embodiment. The outer peripheral regions 205 are not to touch the transducers 3. The dike protrusions 201 represent third protrusions.

As shown in FIG. 4, the touch panel 200 in accordance with the second embodiment has a double-dike structure, having the dike protrusions 201 in the outer peripheral regions 205 that are not to touch the transducers 3, and the second protrusions 202 on the inner peripheral regions 204 that are not to touch the transducers 3 either. The dike protrusions 201 are secured to the glass substrate 2 with double-faced adhesive tape 203. The double-faced adhesive tape 203 is preferably made of an adhesive material having a sound absorbing effect. The double-faced adhesive tape 203 represents a bonding means. The bonding may be performed with an adhesive agent, instead of the double-faced adhesive tape 203.

Conventionally, a sound absorbing pattern is formed in the outer peripheral regions of the glass substrate 2, so as to prevent the SAWs from being reflected from the end faces. However, it is possible to omit the sound absorbing pattern in the second embodiment, because the adhesive material of the double-faced adhesive tape 203 has a sound absorbing effect. Thus, surface acoustic wave can be prevented from being reflected from the end faces. Also, the double-faced adhesive tape 203 shields the touch panel 200 from the surroundings, so that dust and moisture that have adverse influence on SAW propagation are completely shut out.

Each of the second protrusions 202 has such a cross-sectional shape as to reduce the contact area with the glass substrate 2. When the transparent resin film 4 is strongly pressed through a touch operation, the contact area of the top end of each second protrusion 202 with the glass substrate 2 is too small to affect SAW propagation. Even if the transparent resin film 4 is pressed with a very strong force, the transparent resin film 4 does not touch the transducers 3, and accordingly, does not affect transmission and reception of SAWs.

Like the touch panel 100 in accordance with the first embodiment, the touch panel 200 in accordance with the second embodiment has the transparent resin film 4 made of a material that easily absorbs SAWs, such as cycloolefin, so as to further increase the operability. Also, in the touch panel 200, the dot spacers 6, the dike protrusions 201, and the second protrusions 202 are made of materials that do not easily absorb SAWs, such as acryl. With this structure, erroneous input can be prevented even if an object other than the film member touches the glass substrate 2. Thus, the detection accuracy can be increased.

Third Embodiment

Figure 6:
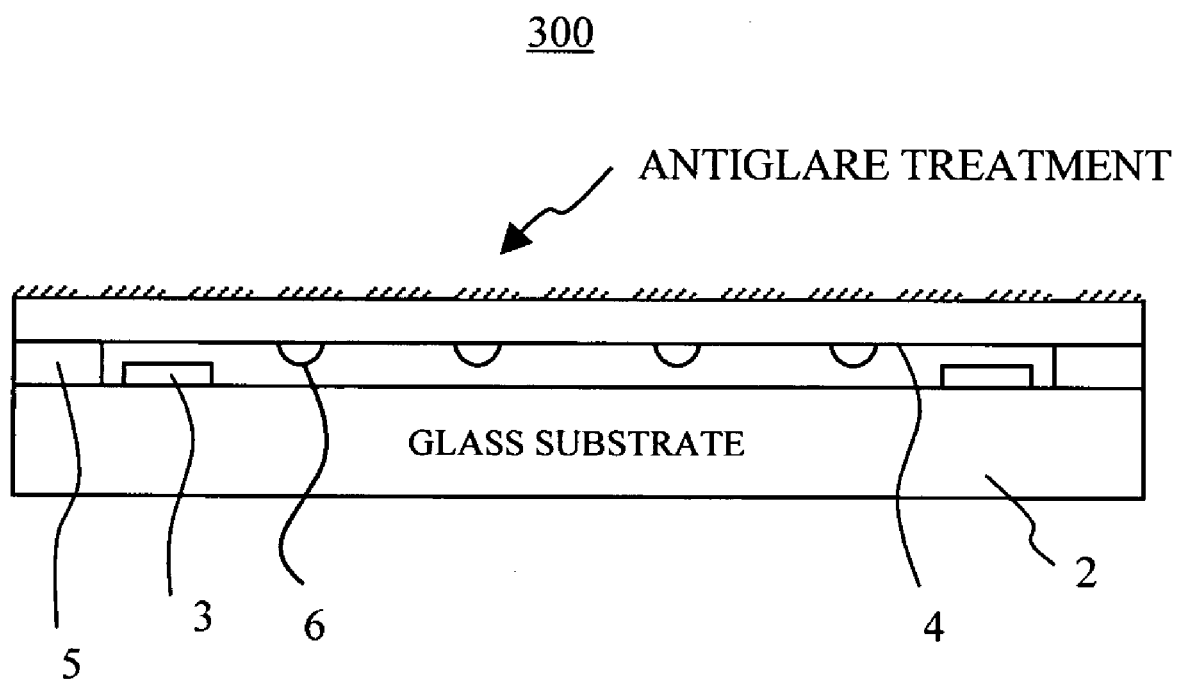
FIG. 6 is a section view of a touch panel in accordance with a third embodiment of the present invention.

FIG. 6 is a section view of a touch panel in accordance with a third embodiment of the present invention. In the touch panel 300 in accordance with the third embodiment, the outermost surface of the transparent resin film 4, which is the same as that of the first embodiment, is subjected to antiglare treatment. In this manner, reflections from the surface can be reduced. In FIG. 6, the same components as those of the foregoing embodiments are denoted by the same reference numerals as the corresponding ones of the foregoing embodiments, and explanation of them is omitted herein.

Fourth Embodiment

Figure 7:
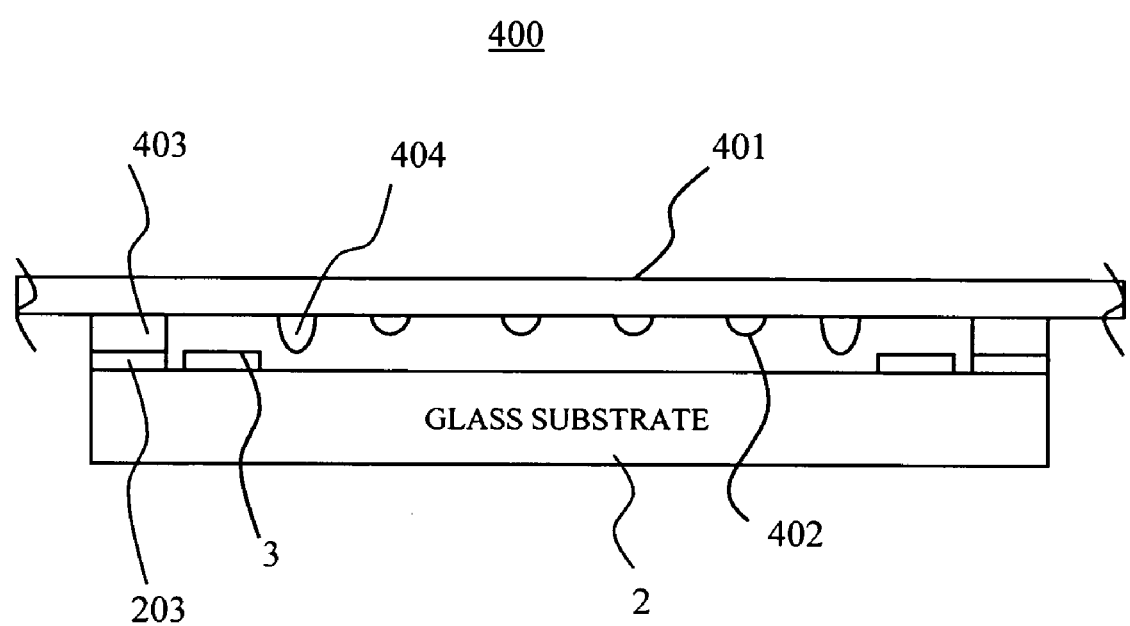
FIG. 7 is a section view of a touch panel in accordance with a fourth embodiment of the present invention.

FIG. 7 is a section view of a touch panel 400 in accordance with a fourth embodiment. In FIG. 7, the same components as those of the foregoing embodiments are denoted by the same reference numerals as the corresponding ones of the foregoing embodiments, and explanation of them will be omitted in the following description. In the touch panel 400 in accordance with the fourth embodiment, a transparent resin case 401 is integrally molded, instead of the transparent resin film 4. Small protrusions 402 and 404 are provided in the corresponding operation area on the substrate-facing surface, so as to give the operation area the same thickness as the outer peripheral regions of the operation area.

As shown in FIG. 7, the small protrusions 402 are dot spacers. Although not shown, the small protrusions 402 may have concavities and convexities, so that interference fringes can be prevented. In the touch panel 400, dike protrusions 403 that are formed in the outer peripheral regions on the substrate-facing surface of the transparent resin case 401 to avoid the transducers 3 are also integrally molded with the transparent resin case 401.

Also, in the touch panel 400, the second protrusions 404 are formed in the inner peripheral regions on the substrate-facing surface of the transparent resin case 401. The inner peripheral regions are not to touch the transducers 3. In this structure, the second protrusions 404 are designed to be closer to the glass substrate 2 than the dot spacers 402 to the glass substrate 2. The second protrusions 404 are also integrally molded with the transparent resin case 401.

The touch panel 400 in accordance with the fourth embodiment may be used as a part of the casing of a small device such as a portable telephone.

Fifth Embodiment

Figure 8:
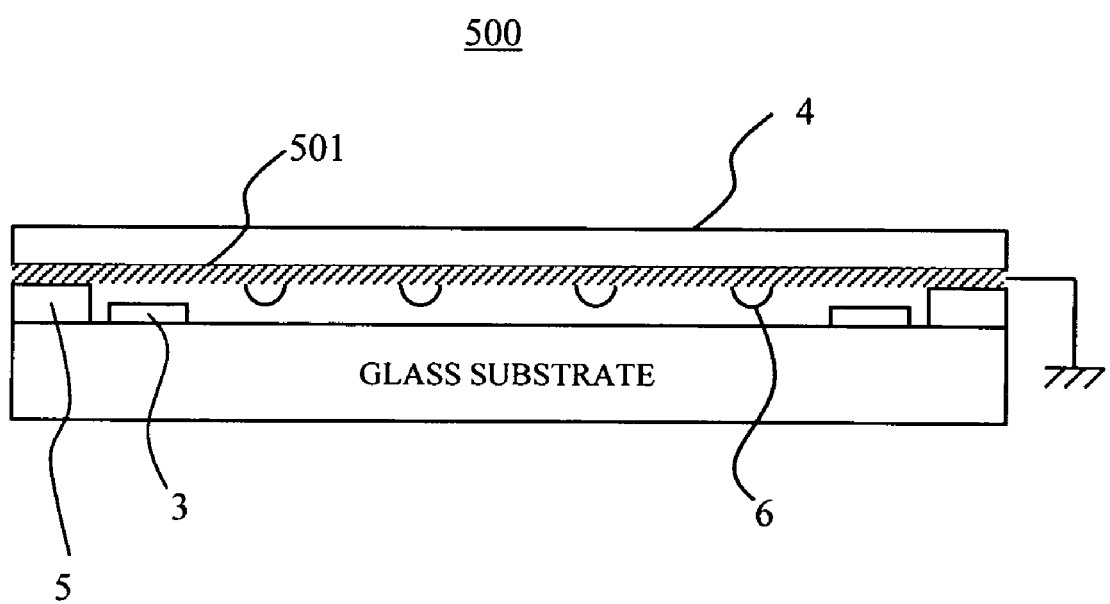
FIG. 8 is a section view of a touch panel in accordance with a fifth embodiment of the present invention.

FIG. 8 is a section view of a touch panel in accordance with a fifth embodiment. In FIG. 8, the same components as those of the foregoing embodiments are denoted by the same reference numerals as the corresponding ones of the foregoing embodiment, and explanation of them will be omitted in the following description. The touch panel 500 in accordance with the fifth embodiment has a transparent conductive film 501 (such as an ITO film) formed on one surface of the transparent resin film 4. This transparent conductive film 501 is shielded, as shown in FIG. 8.

With the transparent conductive film 501, the visibility of the display screen deteriorates due to a decrease of the light transmittance and a change of color. Particularly, in a case where certain electrostatic resistance is required, the transparent conductive film 501 serves as a shield layer to increase the electrostatic resistance. As the touch detection in accordance with this embodiment is a SAW method with high durability, a touch panel that has a longer life than a conventional resistive-film touch panel while having the same electrostatic resistance as the resistive-film touch panel can be realized. Although the transparent conductive film 501 is provided on the lower surface of the transparent resin film 4 in FIG. 8, it is possible to form a transparent conductive film on the upper surface of the transparent resin film 4.

In accordance with the fifth embodiment, the problem with an insulating glass surface having a poor shielding effect and poor electrostatic resistance can be eliminated.

Sixth Embodiment

Figure 9:
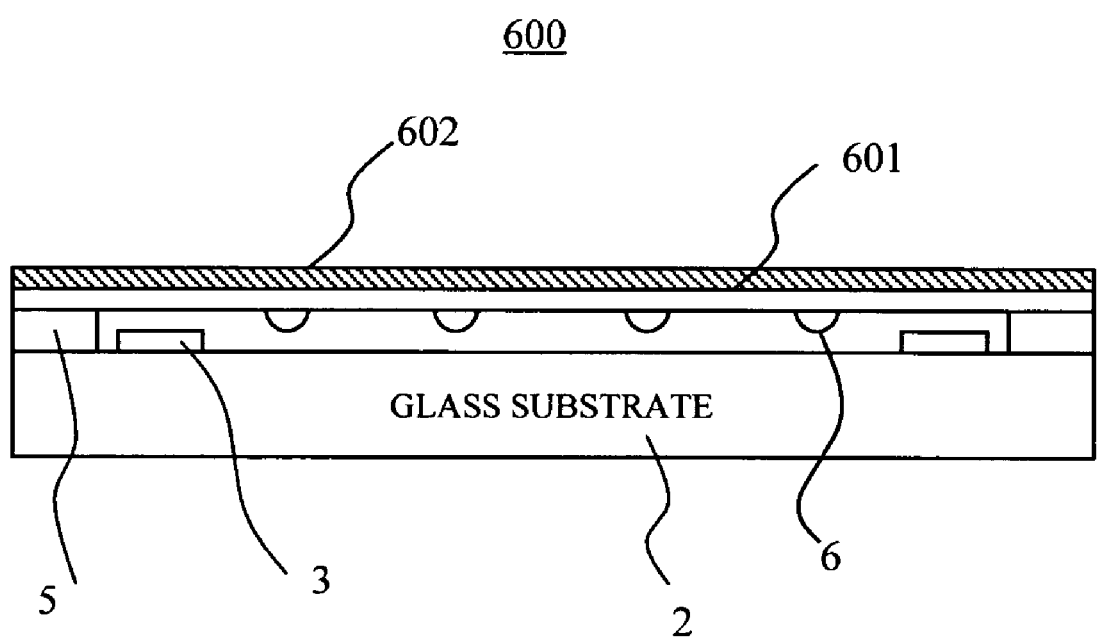
FIG. 9 is a section view of a touch panel in accordance with a sixth embodiment of the present invention.

FIG. 9 is a section view of a touch panel in accordance with a sixth embodiment. In FIG. 9, the same components as those of the foregoing embodiments are denoted by the same reference numerals as the corresponding ones of the foregoing embodiments. The touch panel 600 in accordance with the sixth embodiment has a polarizing plate 602 bonded to the outermost surface of a transparent resin film 601.

So as to minimize the amount of light reflected from the surface of the touch panel 600, a polarizing plate is required for the use in an automobile. The touch panel 600 can properly operate with the polarizing plate 602 bonded to the outermost surface.

It is of course possible to combine the touch panel 600 with a λ/4 phase difference plate to form a circular polarizing panel.

A conventional touch panel with a polarizing plate has good visibility, restraining surface-reflected light and causing almost no reflections. However, the light transmittance of a resistive-film touch panel is so low that the display illumination of the LCD becomes dark. With the touch panel 600 in accordance with the sixth embodiment, on the other hand, a bright screen having no reflections can be realized with a SAW touch panel having high light transmittance.

Seventh Embodiment

Figure 10:
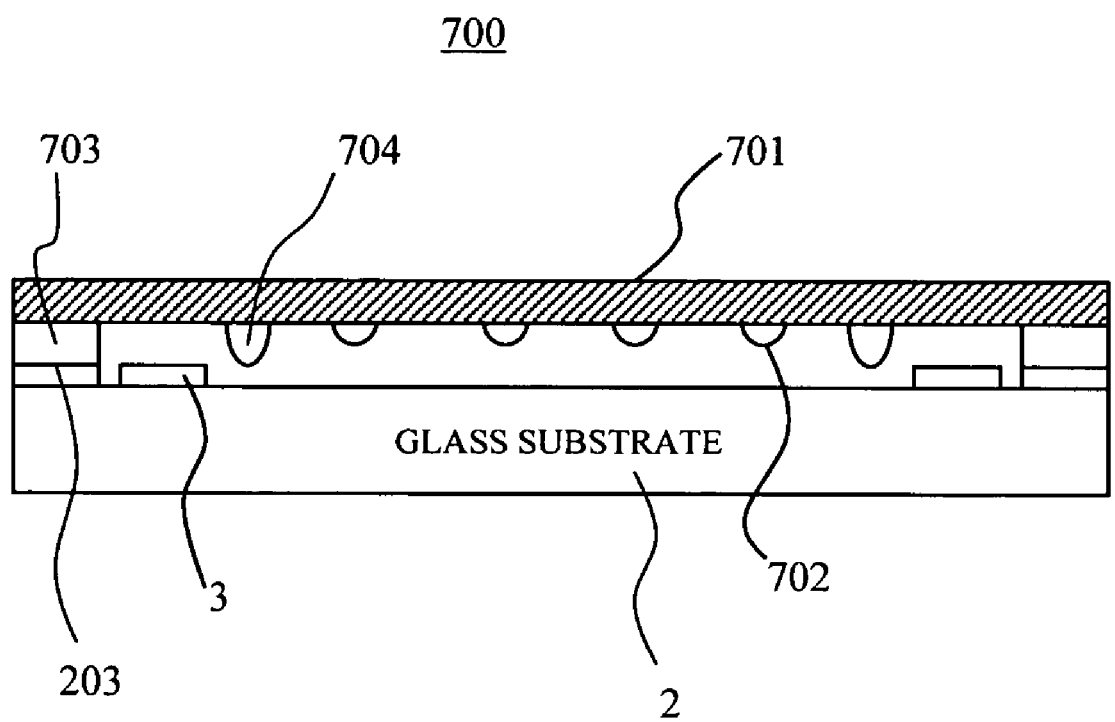
FIG. 10 is a section view of a touch panel in accordance with a seventh embodiment of the present invention.

FIG. 10 is a section view of a touch panel in accordance with a seventh embodiment. In FIG. 10, the same components as those of the foregoing embodiments are denoted by the same reference numerals as the corresponding ones of the foregoing embodiments, and explanation of them will be omitted in the following description. The touch panel 700 in accordance with the seventh embodiment has a polarizing plate 701, instead of the transparent resin film 4 of the touch panel 200 in accordance with the second embodiment.

Dot spacers 702, dike protrusions 703, and second protrusions 704 are formed on the substrate-facing surface of the polarizing plate 701 by a printing process, and the polarizing plate 701 is then attached to the glass substrate 2. Like the dike protrusions 201 of the second embodiment, the dike protrusions 703 are formed in the outer peripheral regions on the substrate-facing surface of the polarizing plate 701 that are not to touch the transducers 3.

Like the second protrusions 202 of the second embodiment, the second protrusions 704 are formed in the inner peripheral regions on the substrate-facing surface of the polarizing plate 701 that are not to touch the transducers 3. Here, the second protrusions 704 are situated closer to the glass substrate 2 than the dot spacers 702 to the glass substrate 2.

As the touch panel 700 of the seventh embodiment does not include a transparent resin film, the light transmittance is increased. Accordingly, the brightness of the display screen that is seen through the touch panel can be further increased.

Eighth Embodiment

Figure 11:
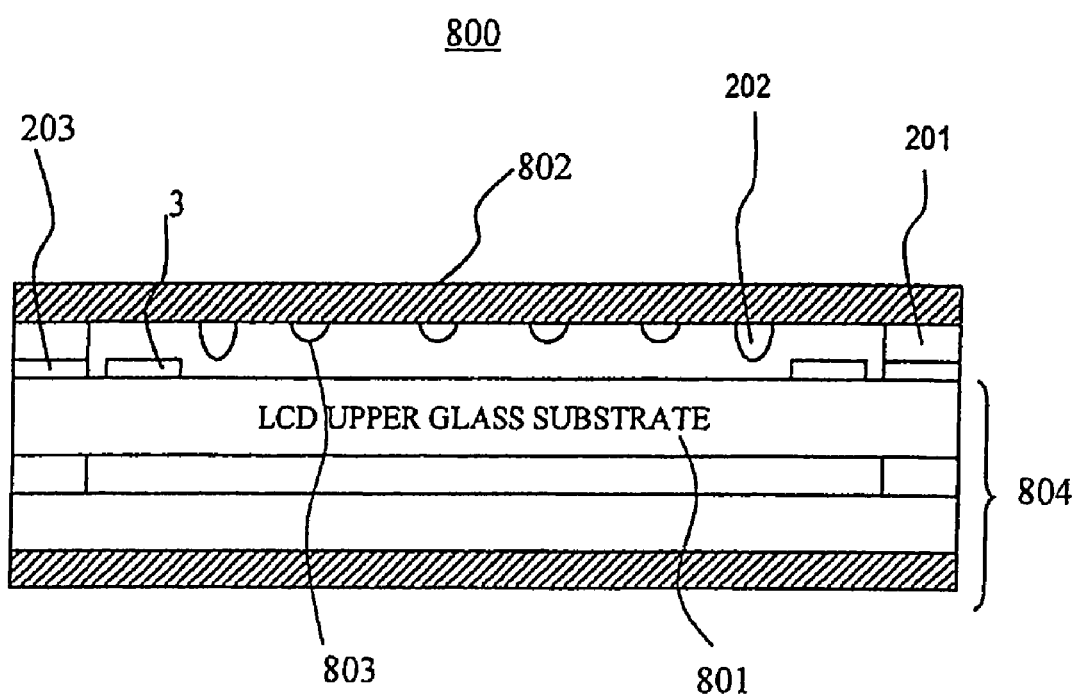
FIG. 11 is a section view of a display device in accordance with an eighth embodiment of the present invention.

FIG. 11 is a section view of a display device in accordance with an eight embodiment. In FIG. 11, the same components as those of the foregoing embodiments are denoted by the same reference numerals as the corresponding ones of the foregoing embodiments, and explanation of them will be omitted in the following description. The display device 800 in accordance with the eighth embodiment has the touch panel 700 of the seventh embodiment formed on the outer surface of an upper glass substrate 801 of a liquid crystal display (LCD) panel 804. More specifically, the SAW transmitting/receiving transducers 3 are formed on the outer surface of the upper glass substrate 801 of the liquid crystal display panel 804, so that a liquid crystal panel and a touch panel are integrated into one device.

A polarizing plate 802 that is essential for a liquid crystal display panel is placed over the upper glass substrate 801 of the liquid crystal display panel 804 having the transducers 3 formed in the outer peripheral regions, with a predetermined distance being kept between the polarizing plate 802 and the upper glass substrate 801. Dot spacers 803, second protrusions 805 and dike protrusions 806 are again used. In this manner, an integrated display device that is equipped with a touch panel is realized. As a touch panel is placed over the outer surface of a liquid crystal panel, a thinner integrated display device that is equipped with a touch panel can be realized in accordance with the eighth embodiment.

Ninth Embodiment

Figure 12:
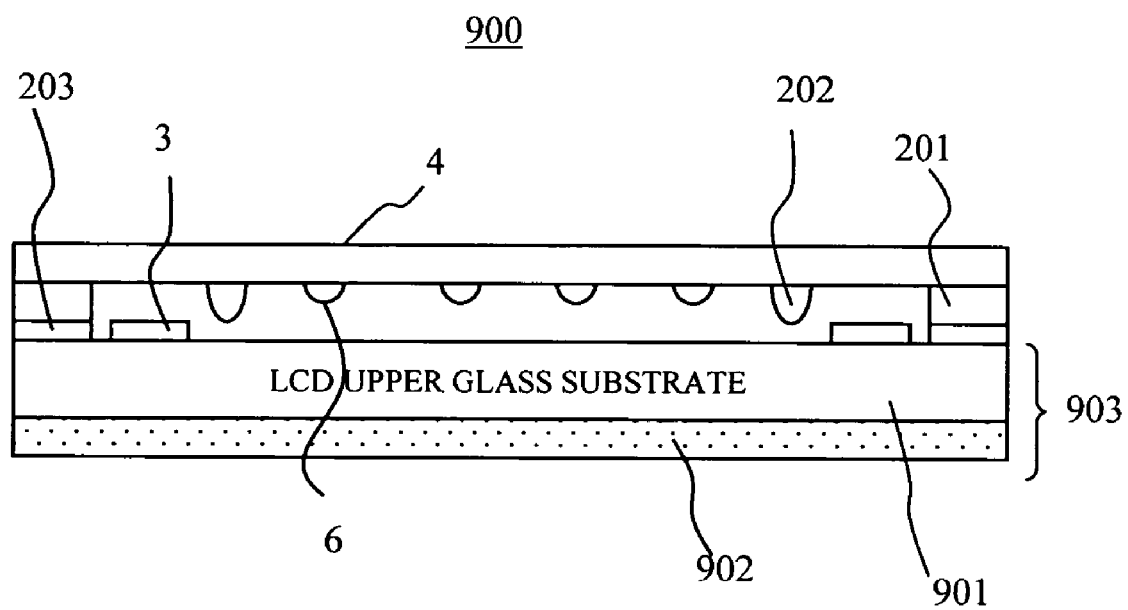
FIG. 12 is a section view of a display device in accordance with a ninth embodiment of the present invention.

FIG. 12 is a section view of a display device in accordance with a ninth embodiment. The display device 900 in accordance with the ninth embodiment is an integrated display device that is equipped with a touch panel and has an EL display panel 903 containing EL elements 902 on the bottom surface of a glass substrate 901 having the SAW receiving/transmitting transducers 3. In the display device 900, the transparent resin film 4 is placed over the outer surface of the glass substrate 901, with a space layer being interposed in between.

The display device 900 is produced in the following manner. Lower electrodes formed by Al thin films, and piezoelectric layers formed by ZnO films are provided on one surface of the glass substrate 901, and comb-like electrodes formed by Al thin films are further stacked on the piezoelectric layers to form the SAW receiving/transmitting transducers 3. The EL elements 902 are then formed on the other surface of the glass substrate 901 with the transducers 3 by an ink jet technique, a photopolymer technique, or the like.

The outer peripheral regions of the transparent resin film 4 are bonded to the EL display panel 903, which has the SAW touch panel produced in the above manner, with the double-faced adhesive tape 203 of a predetermined thickness.

As a touch panel is stacked on the outer surface of an organic EL display, an EL display device that is equipped with a touch panel capable of accurate position detection can be provided in accordance with the ninth embodiment.

If any of the above embodiments is applied to a conventional SAW touch panel, especially, a compact, thin device for mobile equipment, the shock resistance can be improved. Also, even if a touch panel is broken by impact, glass fragments can be prevented from scattering. Further, a touch panel that does not carry out erroneous input even when a drop of water or oil adheres to the surface can be realized.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A touch panel comprising:
a transparent substrate on which surface acoustic waves are propagated;
transmission/reception units formed on peripheral regions of the transparent substrate, and facing each other, to transmit and receive the surface acoustic waves;
a bendable sheet member that faces the transparent substrate, with a space layer being interposed in between, and has a plurality of first protrusions formed on a substrate-facing surface of the sheet member extending towards but spaced from the substrate, and a predetermined operative area on a surface of the sheet member, opposite to the substrate-facing surface; and
a detecting unit that detects the location of an object touching the operative area,
the space layer being provided further out than the transmission/reception units, the operative area, and a surface area of the transparent substrate on which the surface acoustic waves are propagated,
each of the first protrusions being not brought into contact with the transparent substrate so that all of the first protrusions remain spaced from the transparent substrate to prevent the surface acoustic waves from being attenuated by the first protrusions, when an object does not touch the operative area, and at least one of the first protrusions is brought into contact with the transparent substrate to prevent the surface acoustic waves from being attenuated by the first protrusions, when the object touches the operative area,
wherein the sheet member does not contact the substrate when the object touches or does not touch the operative area; and
the transparent substrate not having protrusions on the surface area.

2. The touch panel as claimed in claim 1, wherein the first protrusions are dot spacers.

3. The touch panel as claimed in claim 1, wherein the sheet member has second protrusions that are formed in inner areas of the peripheral regions on the substrate-facing surface, outward of the first protrusions but not touching the transmission/reception units, the second protrusions being situated closer to the transparent substrate than the first protrusions to the transparent substrate.

4. The touch panel as claimed in claim 3, wherein each of the first protrusions and the second protrusions is made of a material that does not absorb a surface acoustic wave as much as the sheet member does.

5. The touch panel as claimed in claim 3, wherein at least one of the first protrusions and the second protrusions are formed through a printing process.

6. The touch panel as claimed in claim 3, wherein at least one of the first protrusions and the second protrusions are formed by integral molding.

7. The touch panel as claimed in claim 1, wherein the sheet member has a predetermined peripheral portion bonded to the transparent substrate via the space layer.

8. The touch panel as claimed in claim 1, wherein:
the space layer includes dike-like protrusions formed in outer peripheral regions on the substrate-facing surface that are not to touch the transmission/reception units; and
the dike-like protrusions are bonded to the transparent substrate with a bonding means.

9. The touch panel as claimed in claim 1, further comprising an antireflection film that is formed on one of the surfaces of the sheet member.

10. The touch panel as claimed in claim 1, wherein the sheet member is subjected to antiglare treatment.

11. The touch panel as claimed in claim 1, further comprising a transparent conductive film that is formed on one of the surfaces of the sheet member.

12. The touch panel as claimed in claim 1, further comprising a polarizing plate that is placed over the sheet member.

13. The touch panel as claimed in claim 1, wherein the sheet member is a polarizing plate.

14. The touch panel according to claim 1, wherein the sheet member is a resin sheet member.

15. The touch panel according to claim 14 wherein the resin sheet member is a transparent resin film.

16. The touch panel according to claim 15, wherein a transparent conductive film is formed on one side of the transparent resin film.

17. The touch panel according to claim 14, wherein the resin sheet member is a transparent resin case.

18. A display device, comprising:
a liquid crystal panel; and
a touch panel that is mounted on the outer surface of the liquid crystal panel, the touch panel including:

a transparent substrate on which a surface acoustic wave is propagated;

first and second transmission/reception units formed on respective peripheral regions of the transparent substrate, in facing relationship, to transmit and receive surface acoustic waves;

a detecting unit that detects the location of an object touching a predetermined operative area; and a bendable sheet member that faces the transparent substrate, with a space layer interposed in between, and has a plurality of first protrusions formed on a substrate-facing surface of the sheet member extending towards but spaced from the substrate, and has the operative area on a surface of the sheet member opposite to the substrate facing surface, the space layer being provided further out than the transmission/reception units, the operative area, and a surface area of the transparent substrate on which the surface acoustic waves are propagated, each of the first protrusions being not brought into contact with the transparent substrate so that all of the first protrusions remain spaced from the transparent substrate to prevent the surface acoustic waves from being attenuated by the first protrusions, when an object does not touch the operative area, and at least one of the first protrusions is brought into contact with the transparent substrate to prevent the surface acoustic waves from being attenuated by the first protrusions, when the object touches the operative area, wherein the sheet member does not contact the substrate when the object does or does not contact the operative area, and the sheet member comprising a polarizing plate, and the transparent substrate not having protrusions on the surface area.

19. A display device, comprising:

an organic EL display panel; and a touch panel that is mounted on outer surface of the organic EL display panel, the touch panel comprising:

a transparent substrate on which surface acoustic wave is propagated;

transmission/reception units formed on peripheral regions of the transparent substrate, facing each other, to transmit and receive surface acoustic wave;

a detecting unit that detects the location of an object touching a predetermined operative area; and a bendable sheet member having a first surface that faces the transparent substrate, with a space layer being interposed in between, and has a plurality of first protrusions formed on the first surface and extending towards but spaced from the substrate, and a second opposite surface facing away from the transparent substrate and having the operative area thereon, the space layer being provided further out than the transmission/reception units, the operative area, and a surface area of the transparent substrate on which the surface acoustic waves are propagated, each of the first protrusions being not brought into contact with the transparent substrate so that all of the first protrusions remain spaced from the transparent substrate to prevent the surface acoustic waves from being attenuated by the first protrusions, when an object does not touch the operative area, and at least one of the first protrusions is brought into contact with the transparent substrate to prevent the surface acoustic waves from being attenuated by the first protrusions, when the object touches the operative area, wherein the sheet member does not contact the substrate when the object does or does not contact the operative area, and the transparent substrate not having protrusions on the surface area.

20. The display device according to claim 19, wherein the sheet member is a resin sheet member.

* * * * *